(12) United States Patent
Okuda

(10) Patent No.: US 9,597,960 B2
(45) Date of Patent: Mar. 21, 2017

(54) DRIVING ASSISTANCE DEVICE

(75) Inventor: Yuji Okuda, Susono (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 14/388,157

(22) PCT Filed: Apr. 13, 2012

(86) PCT No.: PCT/JP2012/060174
§ 371 (c)(1),
(2), (4) Date: Sep. 25, 2014

(87) PCT Pub. No.: WO2013/150662
PCT Pub. Date: Oct. 10, 2013

(65) Prior Publication Data
US 2015/0039186 A1   Feb. 5, 2015

(30) Foreign Application Priority Data

Apr. 2, 2012 (JP) ................... 2012-083880

(51) Int. Cl.
*A01B 69/00* (2006.01)
*B62D 6/00* (2006.01)
(Continued)

(52) U.S. Cl.
CPC .......... *B60K 28/06* (2013.01); *B60K 28/066* (2013.01); *B60W 30/12* (2013.01); *B60W 40/08* (2013.01);
(Continued)

(58) Field of Classification Search
CPC .............. B60W 50/14; B60W 40/09; B60W 2050/143; B60W 40/08; B60W 2540/18;
(Continued)

(56) References Cited

U.S. PATENT DOCUMENTS 8,849,492 B2 * 9/2014 Uno ................. B60W 40/08
434/65
9,180,911 B2 * 11/2015 Yoshihama ......... B62D 15/021
(Continued)

FOREIGN PATENT DOCUMENTS

JP       2001-301640 A    10/2001
JP       2008201311 A      9/2008
(Continued)

OTHER PUBLICATIONS

Guangwu Chen, "Research & Development of Collison Prevention Alarm Systems on Expressways", Chang 'an University, Dec. 31, 2000, pp. 17-18 (4 pgs. total).

Primary Examiner — Jaime Figueroa
(74) Attorney, Agent, or Firm — Sughrue Mion, PLLC

(57) ABSTRACT

In a driving assistance device 1, when an execution determination unit 12 determines that a driving assistance unit 11 performs driving assistance, a consciousness degradation determination unit 13 performs control such that a warning unit 9 is less likely to issue a warning than that when the driving assistance is not performed. Therefore, even when the position of a host vehicle is changed by the steering of the host vehicle by a driving assistance unit 11, it is possible to reduce the discomfort of a driver due to a warning.

12 Claims, 8 Drawing Sheets

(51) Int. Cl.
  *B62D 11/00* (2006.01)
  *B62D 12/00* (2006.01)
  *B63G 8/20* (2006.01)
  *B63H 25/04* (2006.01)
  *G05D 1/00* (2006.01)
  *G06F 7/00* (2006.01)
  *G06F 17/00* (2006.01)
  *G06F 19/00* (2011.01)
  *B60K 28/06* (2006.01)
  *B60W 50/14* (2012.01)
  *G08G 1/16* (2006.01)
  *B60W 40/09* (2012.01)
  *B60W 30/12* (2006.01)
  *B60W 40/08* (2012.01)

(52) U.S. Cl.
  CPC ............ *B60W 40/09* (2013.01); *B60W 50/14* (2013.01); *G08G 1/167* (2013.01); *B60W 2040/0818* (2013.01); *B60W 2050/143* (2013.01); *B60W 2540/18* (2013.01)

(58) Field of Classification Search
  CPC .......... B60W 30/12; B60W 2040/0818; B60K 28/066; B60K 28/06; G08G 1/167
  USPC .............................. 701/1, 41, 42, 43, 44, 70
  See application file for complete search history.

(56) References Cited

U.S. PATENT DOCUMENTS

| | | |
|---|---|---|
| 2002/0007239 A1 | 1/2002 | Matsumoto et al. |
| 2005/0085954 A1* | 4/2005 | Isaji .................... B60K 28/066 701/1 |
| 2005/0273261 A1* | 12/2005 | Niwa ................... B62D 15/029 701/301 |
| 2008/0185207 A1* | 8/2008 | Kondoh ................ B60W 30/16 180/272 |
| 2009/0160631 A1 | 6/2009 | Galley et al. |
| 2010/0125386 A1* | 5/2010 | Ibrahim ................ B60W 50/14 701/36 |
| 2011/0254956 A1* | 10/2011 | Ishikawa ............... B60W 40/08 348/148 |
| 2012/0072097 A1* | 3/2012 | Ohta ........................ B60R 1/00 701/118 |
| 2013/0054049 A1* | 2/2013 | Uno ...................... B60W 40/08 701/1 |
| 2013/0345900 A1* | 12/2013 | Usui ..................... B60W 30/12 701/1 |
| 2014/0095027 A1* | 4/2014 | Okuda ............... B60K 31/0008 701/41 |
| 2014/0300478 A1* | 10/2014 | Kume .................. B60K 28/066 340/576 |
| 2015/0088397 A1* | 3/2015 | Burton ..................... A61B 5/18 701/70 |
| 2015/0203126 A1* | 7/2015 | Kobana ................ B60W 50/12 701/93 |

FOREIGN PATENT DOCUMENTS

| | | |
|---|---|---|
| JP | 2008-542934 A | 11/2008 |
| JP | 2011-057037 A | 3/2011 |
| JP | 2011-216058 A | 10/2011 |

* cited by examiner

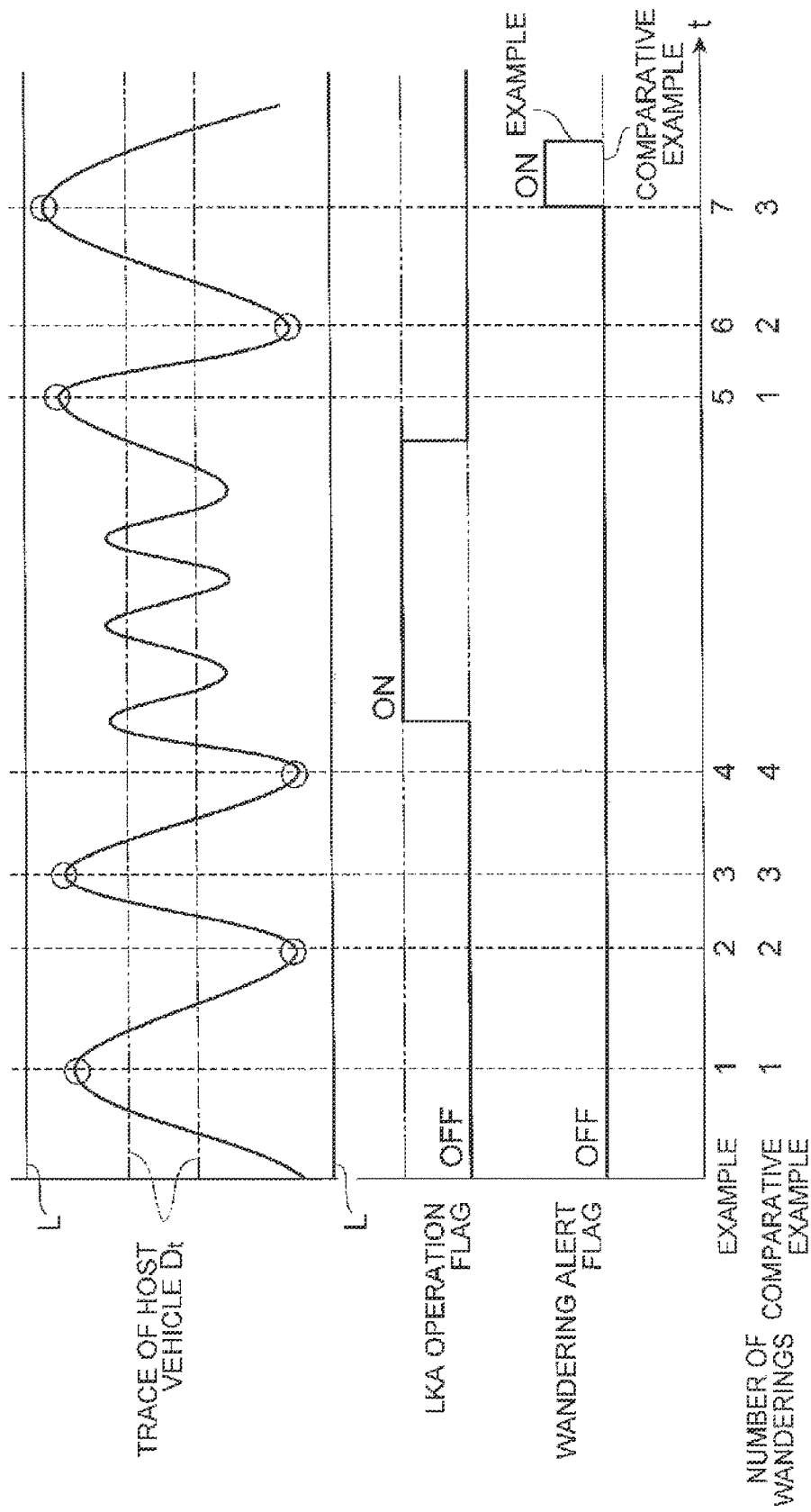

DRIVING ASSISTANCE DEVICE

CROSS REFERENCE TO RELATED APPLICATIONS

This application is a National Stage of International Application No. PCT/JP2012/060174 filed Apr. 13, 2012, claiming priority based on Japanese Patent Application No. 2012-083880 filed Apr. 2, 2012, the contents of all of which are incorporated herein by reference in their entirety.

TECHNICAL FIELD

The present invention relates to a driving assistance device including a device which determines wandering due to the carelessness of a driver or a consciousness-degraded state of the driver.

BACKGROUND ART

For example, a driving assistance device disclosed in Patent Literature 1 has been known as a device for assisting the driving of a host vehicle. Patent Literature 1 discloses a lane keeping device which generates steering torque in order to maintain the traveling position of the host vehicle in the lane, for example, when the host vehicle is likely to deviate from the traveling lane. In addition, a driving assistance device disclosed in Patent Literature 2 has been known as the device for assisting the driving of the host vehicle. Patent Literature 2 discloses a control unit which detects the carelessness of the driver on the basis of a variation in the angle of a steering wheel due to a steering wheel operation of the driver and issues a warning when the carelessness is detected.

CITATION LIST

Patent Literature

[Patent Literature 1] Japanese Unexamined Patent Application Publication No. 2001-301640
[Patent Literature 2] Japanese Unexamined Patent Application Publication No. 2008-542934

SUMMARY OF INVENTION

Technical Problem

When the lane keeping device disclosed in Patent Literature 1 performs driving assistance, in some cases, the host vehicle wanders due to a rapid change in the steering angle or lateral position of the host vehicle. It is difficult to determine whether the wandering is caused by the operation of the driver or steering by the lane keeping device. Therefore, in a structure in which the lane keeping device and the control unit disclosed in Patent Literature 2 are combined with each other, when the host vehicle wanders due to steering by the lane keeping device even though the consciousness of the driver is clear, the control unit detects the carelessness of the driver and issues a warning. As a result, the driver feels discomfort.

An object of the invention is to provide a driving assistance device which can reduce the discomfort of the driver due to driving assistance, such as the issue of a warning, when the consciousness of the driver is clear.

Solution to Problem

In order to solve the above-mentioned problems, a driving assistance device according to the invention includes: driving assistance means for performing driving assistance in order to control a position of a host vehicle relative to a traveling lane; execution determination means for determining whether the driving assistance means performs the driving assistance; consciousness degradation determination means for determining whether a driver of the host vehicle is in a consciousness-degraded state on the basis of a traveling state of the host vehicle; and warning means for issuing a warning when the consciousness degradation determination means determines that the driver is in the consciousness-degraded state. When the execution determination means determines that the driving assistance means performs the driving assistance, the warning means is less likely to issue the warning than that when the execution determination means determines that the driving assistance means does not perform the driving assistance.

In the driving assistance device, when the execution determination means determines that the driving assistance means performs the driving assistance, the warning means is less likely to issue the warning than that when the execution determination means determines that the driving assistance means does not perform the driving assistance. Therefore, even when the position of the host vehicle is changed by the steering of the host vehicle by the driving assistance means, the warning is less likely to be issued. As a result, it is possible to reduce the discomfort of the driver due to a warning when the consciousness of the driver is clear.

In the above-mentioned driving assistance device, when the execution determination means determines that the driving assistance means performs the driving assistance, the consciousness degradation determination means may be less likely to determine that the driver of the host vehicle is in the consciousness-degraded state than that when the execution determination means determines that the driving assistance means does not perform the driving assistance. According to this structure, even when the vehicle wanders due to steering by the driving assistance means, the driver is less likely to be determined in the consciousness-degraded state. Therefore, it is possible to reliably reduce the discomfort of the driver due to driving assistance, such as the issue of a warning, when the consciousness of the driver is clear.

The warning means may be set to a warning issue stop state in which the warning means stops the issue of the warning when the execution determination means determines that the driving assistance means performs the driving assistance. According to this structure, even when the vehicle wanders due to steering by the driving assistance means, the warning means does not issue the warning. Therefore, it is possible to reduce the discomfort of the driver due to driving assistance, such as the issue of a warning, when the consciousness of the driver is clear.

In a case in which the execution determination means determines that the driving assistance means performs the driving assistance, when a warning permission condition which is predetermined for the traveling state of the host vehicle is established, the warning means may be set to a warning issuable state in which the warning means can issue the warning. When the warning permission condition for the traveling state of the host vehicle is not established, the warning means may be set to a warning issue stop state in which the warning means stops the issue of the warning. According to this structure, since the warning permission condition is added as a condition for issuing the warning, the warning means is less likely to issue the warning. Therefore, it is possible to reduce the discomfort of the driver due to driving assistance, such as the issue of a warning, when the consciousness of the driver is clear.

A driving assistance device according to the invention includes: driving assistance means for performing driving assistance in order to control a position of a host vehicle relative to a traveling lane; execution determination means for determining whether the driving assistance means performs the driving assistance; consciousness degradation determination means for determining whether a driver of the host vehicle is in a consciousness-degraded state on the basis of a traveling state of the host vehicle; and warning means for issuing a warning when the consciousness degradation determination means determines that the driver is in the consciousness-degraded state. When the execution determination means determines that the driving assistance means performs the driving assistance, stimulation which is given to the driver by the warning issued by the warning means is less than that when the execution determination means determines that the driving assistance means does not perform the driving assistance.

In the driving assistance device, when the execution determination means determines that the driving assistance means performs the driving assistance, the stimulation which is given to the driver by the warning issued by the warning means is less than that when the execution determination means determines that the driving assistance means does not perform the driving assistance. Therefore, when the position of the host vehicle is changed by the steering of the host vehicle by the driving assistance means, the stimulation which is given to the driver by the warning issued by the warning means is reduced even though the consciousness degradation determination means determines that the driver is in the consciousness degradation determination state. As a result, it is possible to reduce the discomfort of the driver due to a warning when the consciousness of the driver is clear.

When the execution determination means determines that an amount of control of the driving assistance is less than a threshold value, warning determination means may perform control such that the warning means is less likely to issue the warning than that when the execution determination means determines that the driving assistance means does not perform the driving assistance. When the amount of control of the driving assistance is less than the threshold value, the possibility of the host vehicle deviating from a traveling lane is low and it is not considered that the consciousness of the driver is degraded. Therefore, the warning means is less likely to issue the warning when the amount of control of the driving assistance is less than the threshold value. As a result, it is possible to reduce the discomfort of the driver due to a warning when the consciousness of the driver is clear.

When the execution determination means determines that the driving assistance starts while the consciousness degradation determination means performs consciousness degradation determination, the consciousness degradation determination means may temporarily interrupt the consciousness degradation determination which is currently being performed. After the execution determination means determines that the driving assistance ends, the consciousness degradation determination means may resume the interrupted consciousness degradation determination. During the driving assistance, even when the consciousness of the driver is degraded, it is easy for the vehicle to travel stably. Therefore, while the driving assistance is being performed, the accuracy of the consciousness degradation determination is reduced. From this point, in the invention, when the execution determination means determines that the driving assistance starts, the consciousness degradation determination which is currently being performed is temporarily interrupted. After the execution determination means determines that the driving assistance ends, the interrupted consciousness degradation determination is resumed. Therefore, it is possible to perform the consciousness degradation determination, except for the result of the consciousness degradation determination obtained in the state in which the accuracy of determination is low. As a result, it is possible to perform the consciousness degradation determination with high accuracy.

The driving assistance device may further include assistance release detection means for detecting whether the driving assistance by the driving assistance means is released by establishment of a plurality of release conditions. When the assistance release detection means detects that the driving assistance is released, the warning means may be set to the warning issuable state in which the warning means can issue the warning or the warning issue stop state in which the warning means stops the issue of the warning, according to an establishment state of the release conditions, after the driving assistance is released. According to this structure, after the driving assistance is released, it is possible to set a desired warning state depending on the release conditions of the driving assistance.

The driving assistance device may further include operation release determination means for determining whether the driving assistance is released by an operation of the driver after the assistance release detection means detects that the driving assistance by the driving assistance means is released. When the operation release determination means determines that the driving assistance is released by an operation other than the operation of the driver, the warning means may be set to the warning issuable state after the driving assistance is released. According to this structure, when the warning driving assistance is released by, for example, the conditions of the system other than the operation of the driver, it is possible to avoid the warning means from being set to the warning issue stop state, without the driver being aware.

The driving assistance device may further include operation release determination means for determining whether the driving assistance is released by an operation of the driver after the assistance release detection means detects that the driving assistance by the driving assistance means is released. In a case in which the operation release determination means determines that the driving assistance is released by an operation other than the operation of the driver, when the warning means is set to the warning issue stop state immediately before the driving assistance is released, the warning means may be set to the warning issue stop state after the driving assistance is released. When the warning means is set to the warning issuable state immediately before the driving assistance is released, the warning means may be set to the warning issuable state after the driving assistance is released. According to this structure, when the driving assistance is released by, for example, the conditions of the system other than the operation of the driver, it is possible to automatically return the warning mode to the warning state immediately before the driving assistance is released, without imposing a burden to the driver.

The driving assistance device may further include operation release determination means for determining whether the driving assistance is released by an operation of the driver after the assistance release detection means detects that the driving assistance by the driving assistance means is released. When the operation release determination means determines that the driving assistance is released by the operation of the driver, the warning means may be set to the warning issue stop state after the driving assistance is released. When the driver releases the driving assistance, the driver has an intention to drive the vehicle without driving assistance and it is not considered that the consciousness of the driver is degraded. Therefore, when the driving assistance is released by the operation of the driver, it is possible to return the warning mode to the warning state intended by the driver.

Advantageous Effects of Invention

According to the driving assistance device of the invention, it is possible to reduce the discomfort of the user due to driving assistance, such as the issue of a warning, when the consciousness of the driver is clear.

BRIEF DESCRIPTION OF DRAWINGS

FIG. 8 is a timing chart illustrating examples of a variation in an LKA operation flag and a variation in a wandering alert flag depending on the trace of a host vehicle in a driving assistance device 1 according to a seventh embodiment.

DESCRIPTION OF EMBODIMENTS

First Embodiment

Figure 1:
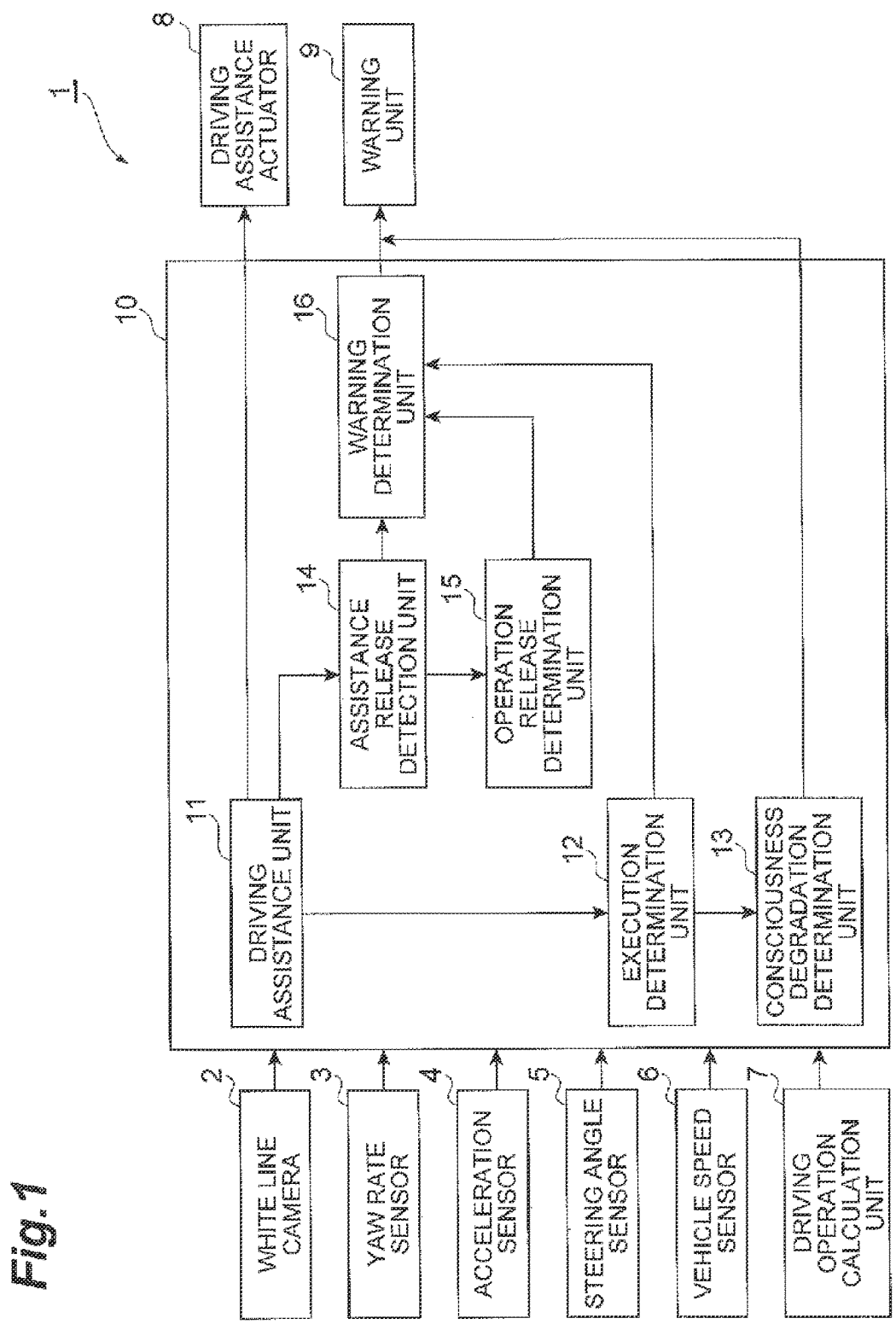
FIG. 1 is a block diagram illustrating the structure of a driving assistance device according to an embodiment.

Hereinafter, a first embodiment of the invention will be described with reference to the accompanying drawings. In the description of the drawings, the same components are denoted by the same reference numerals and the description thereof will not be repeated. For convenience of illustration, the dimension ratio of the drawings is not necessarily identical to that in the following description.

FIG. 1 is a block diagram illustrating the structure of a vehicle driving assistance device 1 according to the first embodiment. The driving assistance device 1 assists the driving of a vehicle by a driver and has a function of performing driving assistance for driving the host vehicle along a traveling lane and issuing a warning to call attention when the consciousness of the driver is degraded.

As shown in FIG. 1, the driving assistance device 1 includes a driving assistance electronic control unit (ECU) 10. The driving assistance ECU 10 is connected to a white line camera 2, a yaw rate sensor 3, an acceleration sensor 4, a steering angle sensor 5, a vehicle speed sensor 6, a driving operation calculation unit 7, a driving assistance actuator 8, and a warning unit 9. Information from the white line camera 2, the yaw rate sensor 3, the acceleration sensor 4, the steering angle sensor 5, the vehicle speed sensor 6, and the driving operation calculation unit 7 is output to the driving assistance ECU 10. In addition, information from the driving assistance ECU 10 is output to the driving assistance actuator 8 and the warning unit 9.

The white line camera 2 is, for example, a CCD camera and captures, as a moving image, the surroundings of the host vehicle which is traveling through a front window. The white line camera 2 outputs the captured moving image data to the driving assistance ECU 10.

The yaw rate sensor 3 is provided in the vicinity of the center of gravity of the host vehicle and detects a yaw rate about the vertical axis passing through the center of gravity. The yaw rate sensor 3 outputs yaw rate information about the detected yaw rate to the driving assistance ECU 10.

The acceleration sensor 4 is attached to the body of the host vehicle and detects the acceleration of the host vehicle. The acceleration sensor 4 outputs acceleration information about the detected acceleration to the driving assistance ECU 10.

The steering angle sensor 5 is attached to a steering shaft (not shown) of the host vehicle and detects the steering angle of the steering shaft. The steering angle sensor 5 outputs steering angle information about the detected steering angle to the driving assistance ECU 10.

The vehicle speed sensor 6 is, for example, a wheel speed sensor and detects the traveling speed of the host vehicle. The vehicle speed sensor 6 outputs vehicle speed information about the detected vehicle speed to the driving assistance ECU 10.

The driving operation calculation unit 7 calculates the driving operation amount of the host vehicle by the driver. The driving operation calculation unit 7 calculates the driving operation amount of the host vehicle by the driver on the basis of, for example, signals detected by the steering angle sensor, an accelerator sensor, a brake pedal sensor, a torque sensor for detecting steering torque, a blinker sensor, and on/off switches of the driving assistance device 1 including a driving assistance unit 11. The driving operation calculation unit 7 outputs, to the driving assistance ECU 10, driving operation amount information about the calculated driving operation amount of the host vehicle by the driver.

Next, the driving assistance ECU 10 will be described. The driving assistance ECU 10 includes the driving assistance unit 11, an execution determination unit 12, a consciousness degradation determination unit 13, an assistance release detection unit 14, an operation release determination unit 15, and a warning determination unit 16.

The driving assistance unit 11 performs driving assistance in order to control the position of the host vehicle relative to the traveling lane along which the host vehicle is traveling. The driving assistance unit 11 outputs, to the execution determination unit 12, driving assistance execution information indicating that the driving assistance unit 11 is in an execution state while performing the driving assistance. In addition, the driving assistance unit 11 outputs, to the execution determination unit 12, driving assistance stop information indicating that the driving assistance unit 11 is in a stop state while not performing the driving assistance. The driving assistance unit 11 turns on a lane keeping assist (LKA) operation flag while performing the driving assistance and turns off the LKA operation flag while not performing the driving assistance.

The driving assistance unit 11 generates the yaw rate required to drive the host vehicle along the traveling lane while performing the driving assistance. The driving assistance unit 11 calculates target output torque for generating the yaw rate required to drive the host vehicle along the traveling lane and outputs torque information about the calculated target output torque to the driving assistance actuator 8.

The calculation of the target output torque by the driving assistance unit 11 is performed as follows. First, the driving assistance unit 11 performs image processing on the image data output from the white line camera 2. The image processing is performed to detect white lines which partition both ends of the traveling lane along which the host vehicle is traveling and to recognize the traveling lane along which the host vehicle is traveling.

Then, the driving assistance unit 11 detects the positional information of the host vehicle, such as the curve curvature 1/R, offset D, and yaw angle θ of the forward traveling path of the host vehicle, on the basis of the recognized traveling lane. The offset D corresponds to a variation in the position of the host vehicle in the lateral direction with respect to the traveling lane and the yaw angle θ corresponds to the direction of the vehicle. The driving assistance unit 11 calculates target lateral acceleration on the basis of the detected curve curvature (1/R), offset D, and yaw angle θ of the forward traveling path.

Then, the driving assistance unit 11 detects a difference between the target lateral acceleration and the actual lateral acceleration of the host vehicle on the basis of the target lateral acceleration, the vehicle speed information of the host vehicle output from the vehicle speed sensor 6, and the yaw rate information output from the yaw rate sensor 3. The driving assistance unit 11 calculates, as the target output torque, torque at which the detected difference between the target lateral acceleration and the actual lateral acceleration is removed.

The driving assistance unit 11 controls the driving assistance actuator 8 such that the calculated target output torque is generated. As such, the driving assistance unit 11 controls the steering amount of the driving assistance actuator 8 to generate the yaw rate for driving the host vehicle along the traveling lane. In addition, the driving assistance unit 11 may make a difference in braking force between the left and right wheels of the host vehicle to generate the yaw rate for driving the vehicle along the traveling lane. As a result, the deviation of the host vehicle from the traveling lane is suppressed and the host vehicle travels along the traveling lane. In addition, the driving assistance unit 11 outputs torque information about the calculated target output torque or control amount information about a driving assistance control amount, such as the difference in braking force between the left and right wheels of the host vehicle, to the consciousness degradation determination unit 13, the assistance release detection unit 14, and the warning determination unit 16.

The execution determination unit 12 determines whether the driving assistance unit 11 performs driving assistance. When the driving assistance execution information is output from the driving assistance unit 11, the execution determination unit 12 determines that the driving assistance unit 11 performs the driving assistance. When the driving assistance stop information is output from the driving assistance unit 11, the execution determination unit 12 determines that the driving assistance unit 11 does not perform the driving assistance.

When determining that the driving assistance unit 11 performs the driving assistance, the execution determination unit 12 outputs driving assistance execution determination information indicating that the driving assistance is being performed to the consciousness degradation determination unit 13 and the warning determination unit 16. When determining that the driving assistance unit 11 does not perform the driving assistance, the execution determination unit 12 outputs driving assistance stop determination information indicating that the driving assistance is not performed to the consciousness degradation determination unit 13.

The consciousness degradation determination unit 13 determines whether the consciousness of the driver of the host vehicle is degraded on the basis of the traveling state of the host vehicle. The consciousness degradation determination unit 13 acquires vehicle information, such as offset D information about the offset D from the driving assistance unit 11, or steering angle information about the steering angle from the driving operation calculation unit 7. Then, the consciousness degradation determination unit 13 determines whether the host vehicle has a specific behavior, such as a large wandering of the vehicle to the left and right, which is remarkable when consciousness is degraded, on the basis of the acquired vehicle information.

The consciousness degradation determination unit 13 determines that the driver of the host vehicle is in a consciousness-degraded state when the offset D indicated by the offset D information which is acquired from the driving assistance unit 11 oscillates at an amplitude or frequency equal to or greater than a predetermined value for a predetermined period of time or more or when the steering angle indicated by the steering angle information which is acquired from the driving operation calculation unit 7 has a specific pattern which is remarkable in the consciousness-degraded state. In contrast, the consciousness degradation determination unit 13 determines that the driver is not in the consciousness-degraded state when the offset D indicated by the offset D information which is acquired from the driving assistance unit 11 does not oscillate at the amplitude or frequency equal to or greater than the predetermined value for the predetermined period of time or more and when the steering angle indicated by the steering angle information which is acquired from the driving operation calculation unit 7 does not have the specific pattern. When determining that the driver of the host vehicle is in the consciousness-degraded state, the consciousness degradation determination unit 13 outputs information indicating that the driver of the host vehicle is in the consciousness-degraded state to the warning unit 9. When determining that the driver of the host vehicle is not in the consciousness-degraded state, the consciousness degradation determination unit 13 outputs information indicating that the driver of the host vehicle is not in the consciousness-degraded state to the warning unit 9.

In the determination of the consciousness degradation, when the driving assistance execution determination information is output from the execution determination unit 12, the consciousness degradation determination unit 13 raises the standards for determining the consciousness-degraded state such that the driver of the host vehicle is less likely to be determined in the consciousness-degraded state than when the information is not output. When the driving assistance execution determination information is output from the execution determination unit 12, the consciousness degradation determination unit 13 increases the oscillation amplitude of the offset D or a time threshold value for determining the consciousness-degraded state or increases a rapid steering value in the unique pattern, as compared to when the driving assistance stop information is output from the execution determination unit 12, thereby raising the standards for determining the consciousness-degraded state. Alternatively, when the driving assistance execution information is output from the execution determination unit 12, the consciousness degradation determination unit 13 sets to the offset D or the threshold value of the steering angle for determining the consciousness-degraded state to an infinite value, thereby stopping the determination of the consciousness-degraded state. When the driving assistance is performed, the consciousness degradation determination unit 13 performs control such that the driver of the host vehicle is less likely to be determined in the consciousness-degraded state than that when the driving assistance is not performed. That is, when the driving assistance is performed, a warning is less likely to be issued than that when the driving assistance is not performed.

The assistance release detection unit 14 detects that the driving assistance by the driving assistance unit 11 is released by the establishment of a plurality of release conditions. For example, the driving assistance by the driving assistance unit 11 is temporarily released by the conditions of the system, such as the temporal non-detection of the traveling lane by the white line camera, or the driver releases the driving assistance. When detecting that the output of the control amount information from the driving assistance unit 11 is stopped and the driving assistance by the driving assistance unit 11 is released, the assistance release detection unit 14 outputs driving assistance release information indicating that the driving assistance has been released to the operation release determination unit 15 and the warning determination unit 16.

The operation release determination unit 15 determines whether the driving assistance is released on the basis of an operation of the driver. When the driving assistance release information is output from the assistance release detection unit 14, the operation release determination unit 15 determines whether the driving assistance is released by the operation of the driver, on the basis of the information output from the driving operation calculation unit 7.

When the driving operation amount information is not output from the driving operation calculation unit 7, the operation release determination unit 15 determines that the driving assistance is released by the conditions of the system other than the operation of the driver. On the other hand, when the driving operation amount information is output from the driving operation calculation unit 7, the operation release determination unit 15 determines that the driving assistance is released by the operation of the driver. When determining that the driving assistance is released by the operation of the driver, the operation release determination unit 15 outputs operation release information indicating that the driving assistance is released by the operation of the driver to the warning determination unit 16. When determining that the driving assistance is not released by the operation of the driver, the operation release determination unit 15 outputs system release information indicating that the driving assistance is released by the conditions of the system other than the operation of the driver to the warning determination unit 16.

The warning determination unit 16 determines whether to set the warning unit 9 to a warning issuable state or a warning issue stop state, on the basis of outputs from the vehicle speed sensor 6, the execution determination unit 12, the assistance release detection unit 14, and the operation release determination unit 15. The warning issuable state means a state in which a warning can be issued. A warning is issued when the consciousness degradation determination unit 13 determines that the driver is in the consciousness-degraded state. The warning issue stop state means a state in which the issue of a warning is stopped. In the warning issue stop state, a warning is not issued even when the consciousness degradation determination unit 13 determines that the driver is in the consciousness-degraded state. When determining to set the warning unit 9 to the warning issuable state, the warning determination unit 16 outputs information about the warning issuable state to the warning unit 9. When determining to set the warning unit 9 to the warning issue stop state, the warning determination unit 16 outputs information about the warning issue stop state to the warning unit 9. When determining to set the warning unit 9 to the warning issuable state, the warning determination unit 16 turns on a wandering alert flag. When determining to set the warning unit 9 to the warning issue stop state, the warning determination unit 16 turns off the wandering alert flag.

When the speed of the host vehicle output from the vehicle speed sensor 6 is equal to or greater than a predetermined reference value, the warning determination unit 16 determines to set the warning unit 9 to the warning issuable state. On the other hand, when the speed of the host vehicle output from the vehicle speed sensor 6 is less than the predetermined reference value, the warning determination unit 16 determines to set the warning unit 9 to the warning issue stop state.

When the driving assistance stop determination information is output from the execution determination unit 12, the warning determination unit 16 may set the warning unit 9 to the warning issuable state in which the warning unit 9 can issue a warning. When the driving assistance execution determination information is output from the execution determination unit 12, the warning determination unit 16 may set the warning unit 9 to the warning issue stop state.

Even when the driving assistance stop determination information is output from the execution determination unit 12, the warning determination unit 16 may determine to set the warning unit to the warning issuable state when predetermined warning permission conditions for the traveling state of the host vehicle are established and may determine to set the warning unit to the warning issue stop state when the predetermined warning permission conditions for the traveling state of the host vehicle are not established. The warning permission conditions include, for example, the condition that illuminance around the host vehicle which is detected by an illuminance sensor provided in the host vehicle is less than a reference value and the condition that the distance to the vehicle in front which is detected by the forward looking sensor is less than a reference value. The plurality of conditions may be combined into the warning permission conditions. In addition, the warning permission conditions may include the condition that the offset D indicated by the offset D information which is acquired by the driving assistance unit 11 oscillates at an amplitude or frequency equal to or greater than a predetermined value for a predetermined period of time or more or a predetermined number of times or more.

The warning determination unit 16 may reduce a stimulation which is given to the driver by the warning from the warning unit 9 when the execution determination unit 12 determines that the driving assistance is performed by the driving assistance unit 11 and the driving assistance execution determination information is output from the execution determination unit 12. For example, when the warning is a sound, a method for reducing a volume is given as a method for reducing the stimulation given to the driver. When the warning is displayed, for example, the following methods may be used: the size of a displayed image is reduced; brightness is reduced such that a displayed image is not conspicuous; and an image is displayed in an inconspicuous color. In addition, these methods may be combined with each other to reduce the stimulation given to the driver. When the execution determination unit 12 determines that the driving assistance is not performed by the driving assistance unit 11 and a warning is issued as both a sound and an image, the number of types of warnings may be reduced, for example, only the method of displaying the warning may be performed to reduce the stimulation given to the driver by the warning.

The warning determination unit 16 determines whether the amount of control of driving assistance indicated by the control amount information which is output from the driving assistance unit 11 is less than a threshold value. When determining that the amount of control is less than the threshold value, the warning determination unit 16 can set the warning unit 9 to the warning issue stop state or reduce the stimulation of the warning given to the driver using the above-mentioned methods. The threshold value of the amount of control is a predetermined constant, for example, 80% of the upper limit of the amount of control of the driving assistance by the driving assistance unit 11.

When the assistance release detection unit 14 detects that the driving assistance is released, the warning determination unit 16 determines whether to set the warning unit 9 to the warning issuable state or the warning issue stop state after the driving assistance is released, on the basis of whether the release conditions are established.

When the assistance release detection unit 14 detects that the driving assistance is released and the system release information is output from the operation release determination unit 15, the warning determination unit 16 determines to set the warning unit 9 to the state immediately before the driving assistance is released. When the warning unit 9 is in the warning issue stop state immediately before the driving assistance is released, the warning determination unit 16 determines to set the warning unit 9 to the warning issue stop state after the driving assistance is released. When the warning unit 9 is in the warning issuable state immediately before the driving assistance is released, the warning determination unit 16 determines to set the warning unit 9 to the warning issuable state after the driving assistance is released.

When the assistance release detection unit 14 detects that the driving assistance is released and the operation release information is output from the operation release determination unit 15, the warning determination unit 16 determines to set the warning unit 9 to the warning issue stop state after the driving assistance is released.

The driving assistance actuator 8 is a mechanical component which controls the traveling of the host vehicle and is, for example, a steering angle control motor. The driving assistance actuator 8 gives output torque to the steering shaft on the basis of the torque information output from the driving assistance ECU 10.

The warning unit 9 issues a warning for calling attention to the driver. The warning unit 9 uses, for example, a warning lamp, a warning buzzer, or a head-up display. The warning lamp or the warning buzzer is incorporated into a speedometer system or a navigation system of the host vehicle and calls attention to the driver using light or a sound, on the basis of information output from the driving assistance ECU 10. The driver sets the volume of the warning sound issued from the warning unit 9 or a snooze mode.

When information indicating that the driver is in the consciousness-degraded state is output from the consciousness degradation determination unit 13 and information about the warning issuable state is output from the warning determination unit 16, the warning unit 9 issues a warning. While information about the warning issue stop state is output from the warning determination unit 16, the warning unit 9 does not issue a warning even though the information indicating that the driver is in the consciousness-degraded state is output from the consciousness degradation determination unit 13. In addition, while information indicating that the driver of the host vehicle is not in the consciousness-degraded state is output from the consciousness degradation determination unit 13, the warning unit 9 does not issue a warning even though the information about the warning issuable state is output from the warning determination unit 16.

Figure 2:
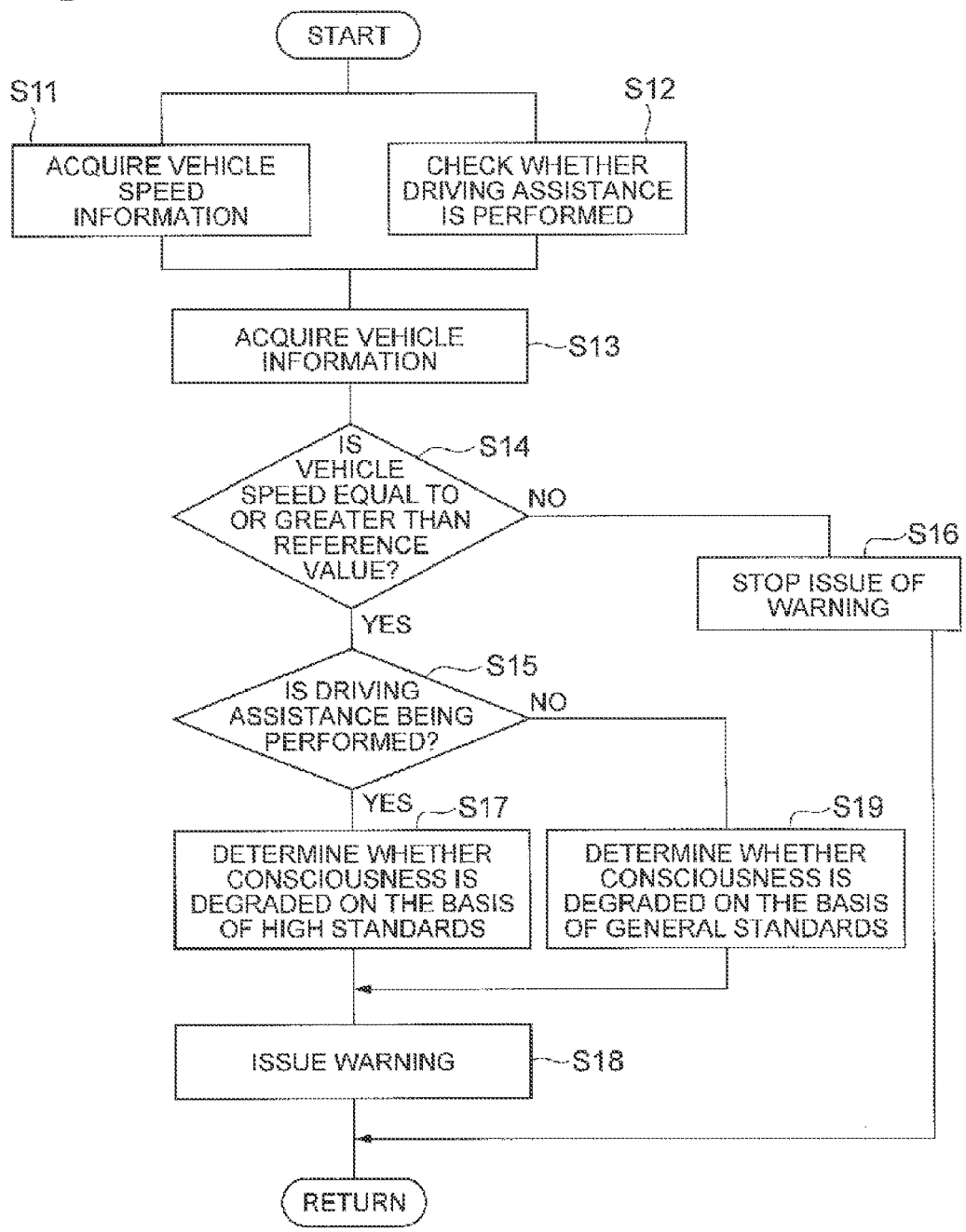
FIG. 2 is a flowchart illustrating the flow of the operation of the driving assistance device according to a first embodiment.

Next, the operation of the driving assistance device 1 will be described with reference to FIG. 2. FIG. 2 is a flowchart illustrating the flow of the operation of the driving assistance device 1 according to the first embodiment.

In the driving assistance device 1, first, the warning determination unit 16 acquires the vehicle speed information about the speed of the host vehicle which is output from the vehicle speed sensor 6 (S11). When the driving assistance execution information or the driving assistance stop information is output from the driving assistance unit 11, the execution determination unit 12 determines whether the driving assistance unit 11 performs driving assistance (S12). Then, the consciousness degradation determination unit 13 acquires vehicle information, such as the offset D information about the offset D from the driving assistance unit 11 or the steering angle information about the steering angle from the driving operation calculation unit 7 (S13).

Then, it is determined whether the value of the vehicle speed information output from the vehicle speed sensor 6 is equal to or greater than a reference value (S14). When it is determined that the value of the vehicle speed information output from the vehicle speed sensor 6 is equal to or greater than the reference value (S14, YES), the execution determination unit 12 determines whether the driving assistance unit 11 performs driving assistance (S15). On the other hand, when it is determined that the value of the vehicle speed information output from the vehicle speed sensor 6 is not equal to or greater than the reference value (S14; NO), the execution determination unit 12 does not determine whether the driving assistance unit 11 performs driving assistance and the warning determination unit 16 determines to set the warning unit 9 to the warning issue stop state, outputs information about the warning issue stop state to the warning unit 9 (S16), and ends this operation.

In S15, the execution determination unit 12 determines whether the driving assistance unit 11 performs driving assistance. When the driving assistance execution information is output from the driving assistance unit 11, the execution determination unit 12 determines that the driving assistance is performed. When the driving assistance stop information is output from the driving assistance unit 11, the execution determination unit 12 determines that the driving assistance is not performed.

When the execution determination unit 12 determines that the driving assistance unit 11 performs the driving assistance (S15, YES), the consciousness degradation determination unit 13 increases the oscillation amplitude of the offset D or the time threshold value for determining the consciousness-degraded state or increases the value of rapid steering in the unique pattern to raise the standards for determining the consciousness-degraded state and determines consciousness degradation (S17). Then, when the consciousness degradation determination unit 13 determines that the driver of the host vehicle is in the consciousness-degraded state, the warning unit 9 issues a warning (S18) and this operation ends.

On the other hand, when the execution determination unit 12 determines that the driving assistance unit 11 does not perform the driving assistance (S15, NO), the consciousness degradation determination unit 13 determines the consciousness degradation on the basis of a general criterion (S19). When the consciousness degradation determination unit 13 determines that the driver of the host vehicle is in the consciousness-degraded state, the warning unit 9 issues a warning (S18) and this operation ends. When the consciousness degradation determination unit 13 determines that the driver is not in the consciousness-degraded state, the warning unit 9 does not issue a warning and this operation ends.

Figure 3:
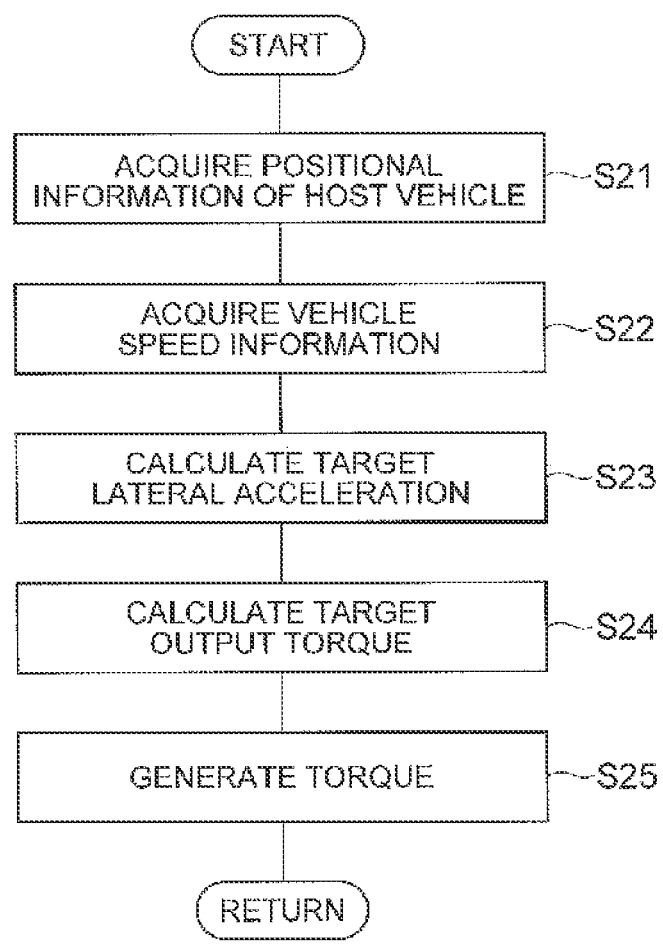
FIG. 3 is a flowchart illustrating the operation procedure of a driving assistance unit according to the first embodiment.

The driving assistance by the driving assistance unit 11 of the driving assistance device 1 is performed by, for example, the following method. Next, the operation of the driving assistance unit 11 of the driving assistance device 1 will be described with reference to the flowchart shown in FIG. 3. FIG. 3 is the flowchart illustrating the flow of the operation of the driving assistance unit 11 of the driving assistance device 1 shown in FIG. 1.

First, the driving assistance unit 11 calculates the positional information of the host vehicle on the basis of the traveling lane which is recognized by image processing on the image data (S21). The curve curvature (1/R), the offset D, and the yaw angle θ are acquired as the positional information of the host vehicle. Then, the vehicle speed information of the host vehicle is acquired from the vehicle speed sensor 6 (S22). The target lateral acceleration is calculated on the basis of the acquired positional information and vehicle speed information of the host vehicle (S23). The difference between the target lateral acceleration and the actual lateral acceleration of the host vehicle is calculated on the basis of the target lateral acceleration and vehicle speed information of the host vehicle and the target output torque at which the difference is removed is calculated (S24). The driving assistance unit 11 controls the driving assistance actuator 8 such that the calculated target output torque is generated (S25) and this operation ends.

Figure 4:
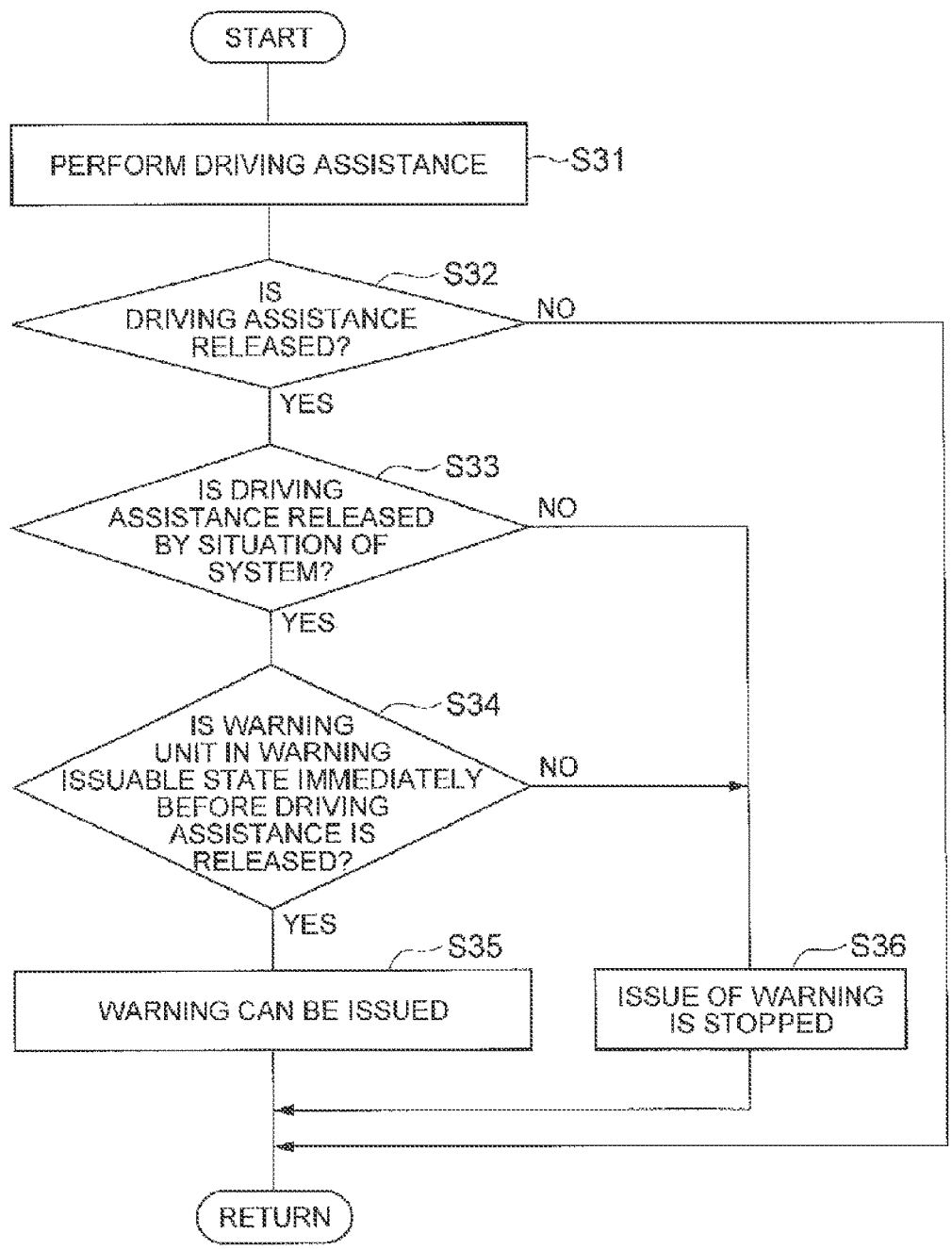
FIG. 4 is a flowchart illustrating the flow of the operation of a warning determination unit after driving assistance is released in the first embodiment.

Next, the operation of the warning determination unit 16 of the driving assistance device 1 after the driving assistance is released will be described with reference to the flowchart shown in FIG. 4. FIG. 4 is the flowchart illustrating the flow of the operation of the warning determination unit 16 of the driving assistance device 1 after the driving assistance is released.

First, the execution determination unit 12 determines that the driving assistance unit 11 performs the driving assistance (S31). The assistance release detection unit 14 detects whether the driving assistance by the driving assistance unit 11 is released during the driving assistance (S32). When the assistance release detection unit 14 detects that the driving assistance by the driving assistance unit 11 is released (S32; YES), the operation release determination unit 15 determines whether the driving assistance is released by an operation of the driver, on the basis of the information output from the driving assistance unit 11 (S33). When the assistance release by detection unit 14 does not detect that the driving assistance driving assistance unit 11 is released (S32; NO), the warning determination unit 16 ends this process, without performing the determination.

When the driving operation amount information is not output from the driving operation calculation unit 7, the operation release determination unit 15 determines that the driving assistance is released by the conditions of the system other than the operation of the driver (S33; YES). On the other hand, when the driving operation amount information is output from the driving operation calculation unit 7, the operation release determination unit 15 determines that the driving assistance is released by the operation of the driver (S33; NO).

When the operation release determination unit 15 determines that the driving assistance is released by the conditions of the system other than the operation of the driver (S33; YES), the warning determination unit 16 sets the warning unit 9 to the state immediately before the driving assistance by the driving assistance unit 11 is released (S34). When the warning unit 9 is in the warning issuable state immediately before the driving assistance by the driving assistance unit 11 is released (S34; YES), the warning determination unit 16 determines to set the warning unit 9 to the warning issuable state after the driving assistance is released, outputs information about the warning issuable state to the warning unit 9 (S35), and ends this operation. On the other hand, when the warning unit 9 is in the warning issue stop state immediately before the driving assistance by the driving assistance unit 11 is released (S34; NO), the warning determination unit 16 determines to set the warning unit 9 to the warning issue stop state after the driving assistance is released, outputs information about the warning issue stop state to the warning unit 9 (S36), and ends this operation.

When the operation release determination unit 15 determines that the driving assistance is released by the operation of the driver (S33; NO), the warning determination unit 16 determines to set the warning unit 9 to the warning issue stop state after the driving assistance is released, outputs information about the warning issue stop state to the warning unit 9 (S36), and ends this operation.

As described above, in the driving assistance device 1 according to first embodiment, when the execution determination unit 12 determines that the driving assistance unit 11 performs the driving assistance, the consciousness degradation determination unit 13 raises the standards for determining the consciousness-degraded state such that the driver of the host vehicle is less likely to be determined in the consciousness-degraded state than that when the execution determination unit 12 determines that the driving assistance unit 11 does not perform the driving assistance. Therefore, the driver is less likely to be determined in the consciousness-degraded state even when the offset D oscillates at an amplitude or frequency equal to or greater than a predetermined value for a predetermined period of time or more or even in a unique pattern in which the steering angle increases significantly in the consciousness-degraded state, as a result of the steering of the host vehicle by the driving assistance unit 11. Therefore, it is possible to reduce the discomfort of the driver due to a warning when the consciousness of the driver is clear. That is, when the driving assistance is performed, a warning can be less likely to be issued than that when the driving assistance is not performed.

The driving assistance device 1 further includes the assistance release detection unit 14 which detects whether the driving assistance by the driving assistance unit 11 is released when a plurality of release conditions are established. When detecting that the driving assistance is released, the assistance release detection unit 14 determines whether to set the warning unit 9 to the warning issuable state or the warning issue stop state after the driving assistance is released, on the basis of the establishment state of the release conditions. Therefore, it is possible to set the warning to a desired state after the driving assistance is released, according to the release conditions of the driving assistance.

The driving assistance device 1 further includes the operation release determination unit 15 which determines whether the driving assistance is released by the operation of the driver after the assistance release detection unit 14 detects that the driving assistance by the driving assistance unit 11 is released. When the operation release determination unit 15 determines that the driving assistance is released by operations other than the operation of the driver, the warning unit 9 is set to the warning issuable state. Therefore, when the driving assistance is released by the conditions of the system other than the operation of the driver, it is possible to prevent the warning unit 9 from being set to the warning issue stop state, without the driver being aware.

The driving assistance device 1 further includes the operation release determination unit 15 which determines whether the driving assistance is released by the operation of the driver after the assistance release detection unit 14 detects that the driving assistance by the driving assistance unit 11 is released. In the case in which the operation release determination unit 15 determines that the driving assistance is released by operations other than the operation of the driver, when the warning unit 9 is in the warning issue stop state immediately before the driving assistance is released, the warning unit 9 is set to the warning issue stop state after the driving assistance is released. When the warning unit 9 is in the warning issuable state immediately before the driving assistance is released, the warning unit 9 is set to the warning issuable state after the driving assistance is released. Therefore, when the driving assistance is released by, for example, the conditions of the system other than the operation of the driver, it is possible to automatically return the warning unit 9 to the warning state immediately before the driving assistance is released, without imposing a burden to the driver.

The driving assistance device 1 further includes the operation release determination unit 15 which determines whether the driving assistance is released by the operation of the driver after the assistance release detection unit 14 detects that the driving assistance by the driving assistance unit 11 is released. When the operation release determination unit 15 determines that the driving assistance is released by the operation of the driver, the warning unit 9 is set to the warning issue stop state after the driving assistance is released. When the driver releases the driving assistance, it is considered that the driver has an intention to drive the vehicle without driving assistance and it is not considered that the consciousness of the driver is degraded. Therefore, when the driving assistance is released by the operation of the driver, it is possible to return the warning mode to the warning state intended by the driver.

Second Embodiment

Figure 5:
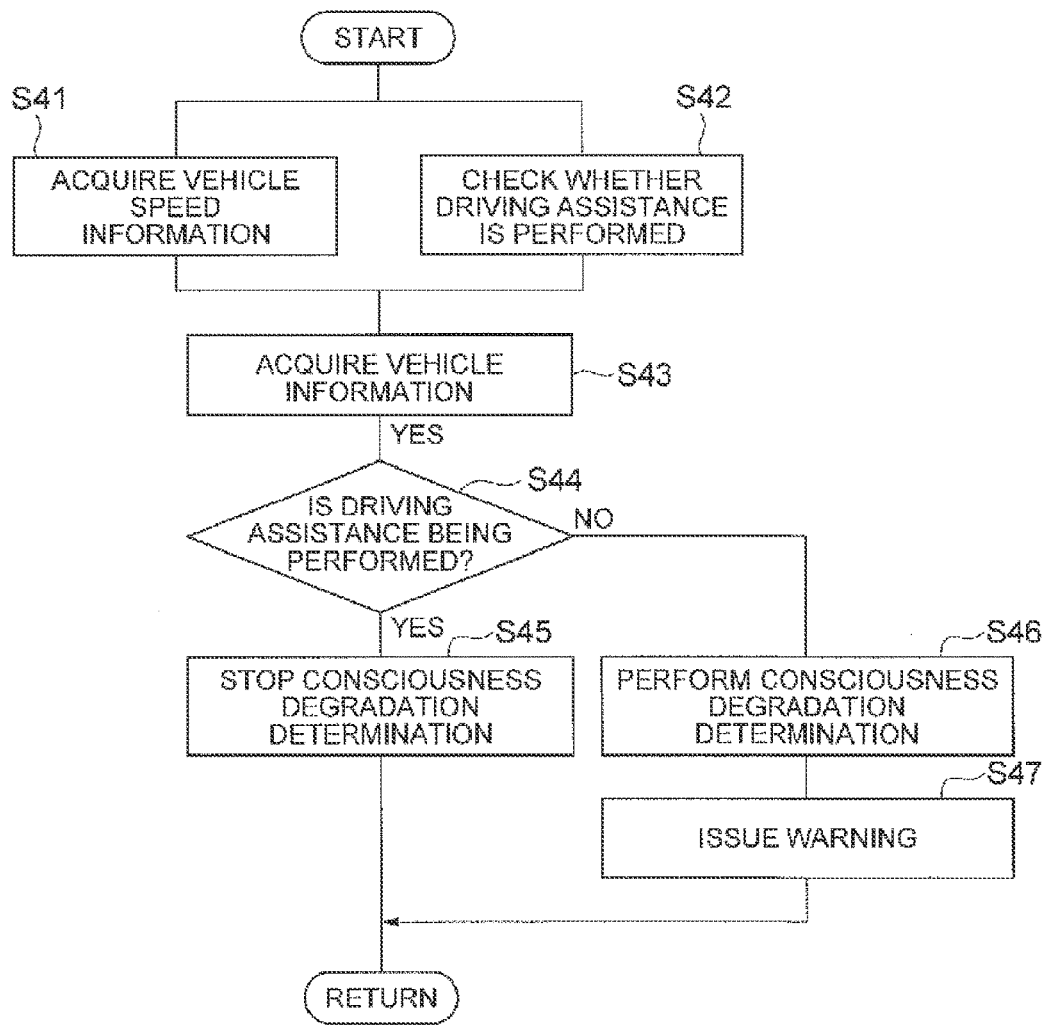
FIG. 5 is a flowchart illustrating the flow of the operation of a driving assistance device according to a second embodiment.

Next, a second embodiment of the invention will be described. In the first embodiment, when the execution determination unit 12 determines that the driving assistance unit 11 performs the driving assistance, the consciousness degradation determination unit 13 raises the standards for determining the consciousness-degraded state which is used to determine whether the driver of the host vehicle is in the consciousness-degraded state on the basis of the acquired vehicle information and performs consciousness degradation determination. In contrast, in the second embodiment, when the execution determination unit 12 determines that the driving assistance unit 11 performs the driving assistance, the consciousness degradation determination unit 13 sets the offset D or the threshold value of the steering angle for determining the consciousness-degraded state to an infinite value and stops the determination of the consciousness-degraded state. Next, the operation of a driving assistance device 1 according to the second embodiment will be described with reference to the flowchart shown in FIG. 5, with an emphasis on the difference from the first embodiment. In the second embodiment, the driving assistance device 1 has the same block structure as that according to the first embodiment except for only the operation thereof.

In the driving assistance device 1 according to the second embodiment, similarly to the driving assistance device 1 according to the first embodiment, first, a warning determination unit 16 acquires information about the speed of the host vehicle which is output from the vehicle speed sensor 6 (S41). When driving assistance execution information or driving assistance stop information is output from a driving assistance unit 11, an execution determination unit 12 determines whether the driving assistance unit 11 performs driving assistance (S42). Then, a consciousness degradation determination unit 13 acquires vehicle information, such as offset D information about an offset D from the driving assistance unit 11 or steering angle information about a steering angle from a driving operation calculation unit 7 (S43).

Then, the execution determination unit 12 determines whether the driving assistance unit 11 performs driving assistance (S44). When the execution determination unit 12 determines that the driving assistance unit 11 performs driving assistance (S44; YES), the consciousness degradation determination unit 13 sets the offset D or the threshold value of the steering angle for determining the consciousness-degraded state to an infinite value and stops the determination of the consciousness-degraded state (S45). Then, this operation ends.

On the other hand, when the execution determination unit 12 determines that the driving assistance unit 11 does not perform the driving assistance (S44; NO), the consciousness degradation determination unit 13 performs the consciousness degradation determination (S46). When the consciousness degradation determination unit 13 determines that the driver of the host vehicle is in the consciousness-degraded state, the warning unit 9 issues a warning (S47) and this operation ends.

As described above, in the driving assistance device 1 according to the second embodiment, when the execution determination unit 12 determines that the driving assistance unit 11 performs the driving assistance, the driver is less likely to be determined in the consciousness-degraded state than that when the driving assistance unit 11 does not perform the driving assistance and the consciousness degradation determination unit 13 stops the determination of the consciousness-degraded state. Therefore, the driver is not determined to be in the consciousness-degraded state and no warning is issued even when the offset D oscillates at an amplitude or frequency equal to or greater than a predetermined value for a predetermined period of time or more or even in a unique pattern in which the steering angle increases significantly in the consciousness-degraded state, as a result of the steering of the host vehicle by the driving assistance unit 11. Therefore, it is possible to reliably reduce the discomfort of the driver due to a warning when the consciousness of the driver is clear. In this embodiment, the consciousness degradation determination unit 13 sets the offset D or the threshold value of the steering angle to an infinite value and stops the determination of the consciousness-degraded state. However, other structures may be used. For example, when the driving assistance is performed, a consciousness degradation determination process of the consciousness degradation determination unit 13 may not be performed to stop the determination of the consciousness-degraded state. In this case, even when the driving assistance is not performed, the driver can be less likely to be determined in the consciousness-degraded state. That is, when the driving assistance is performed, a warning can be less likely to be issued than that when the driving assistance is not performed.

Third Embodiment

Next, a third embodiment of the invention will be described. In the second embodiment, when the execution determination unit 12 determines that the driving assistance unit 11 performs the driving assistance, the consciousness degradation determination unit 13 sets the threshold value for determining the consciousness-degraded state to an infinite value or the consciousness degradation determination unit 13 does not perform the consciousness degradation determination process, thereby stopping the determination of the consciousness-degraded state. In contrast, in the third embodiment, when the execution determination unit 12 determines that the driving assistance unit 11 performs the driving assistance, a warning determination unit 16 outputs information for setting a warning unit to a warning issue stop state such that no warning is issued. Next, the operation of a driving assistance device 1 according to the third embodiment will be described, with an emphasis on the difference from the first and second embodiments.

The driving assistance device 1 according to the third embodiment differs from the driving assistance device 1 according to the second embodiment in a flow when the execution determination unit 12 determines that the driving assistance unit 11 performs the driving assistance. In the third embodiment, a process from Step S41 to Step S43 is the same as that in the flow according to the second embodiment shown in FIG. 4. In addition, the process of the execution determination unit 12 after determining whether the driving assistance is performed is different from that in the second embodiment.

In Step S44, when the execution determination unit 12 determines that the driving assistance unit 11 performs the driving assistance, it outputs driving assistance execution determination information to a warning determination unit 16. Then, the warning determination unit 16 determines to set the warning unit 9 to the warning issue stop state. Then, this operation ends. A flow when the execution determination unit 12 determines that the driving assistance unit 11 does not perform the driving assistance is the same as that in the driving assistance device 1 according to the second embodiment.

As described above, in the driving assistance device 1 according to the third embodiment, when the execution determination unit 12 determines that the driving assistance unit 11 performs the driving assistance, the warning determination unit 16 determines to set the warning unit 9 to the warning issue stop state. Therefore, when the execution determination unit 12 determines that the driving assistance unit 11 performs the driving assistance, a warning is not issued, regardless of whether the consciousness degradation determination unit 13 determines that the driver of the host vehicle is in the consciousness-degraded state or is not in the consciousness-degraded state. That is, when the driving assistance is performed, a warning is less likely to be issued than that when the driving assistance is not performed.

Therefore, it is possible to reduce the discomfort of the driver due to a warning when the consciousness of the driver is clear. That is, when the driving assistance is performed, a warning can be less likely to be issued than that when the driving assistance is not performed.

Fourth Embodiment

Figure 6:
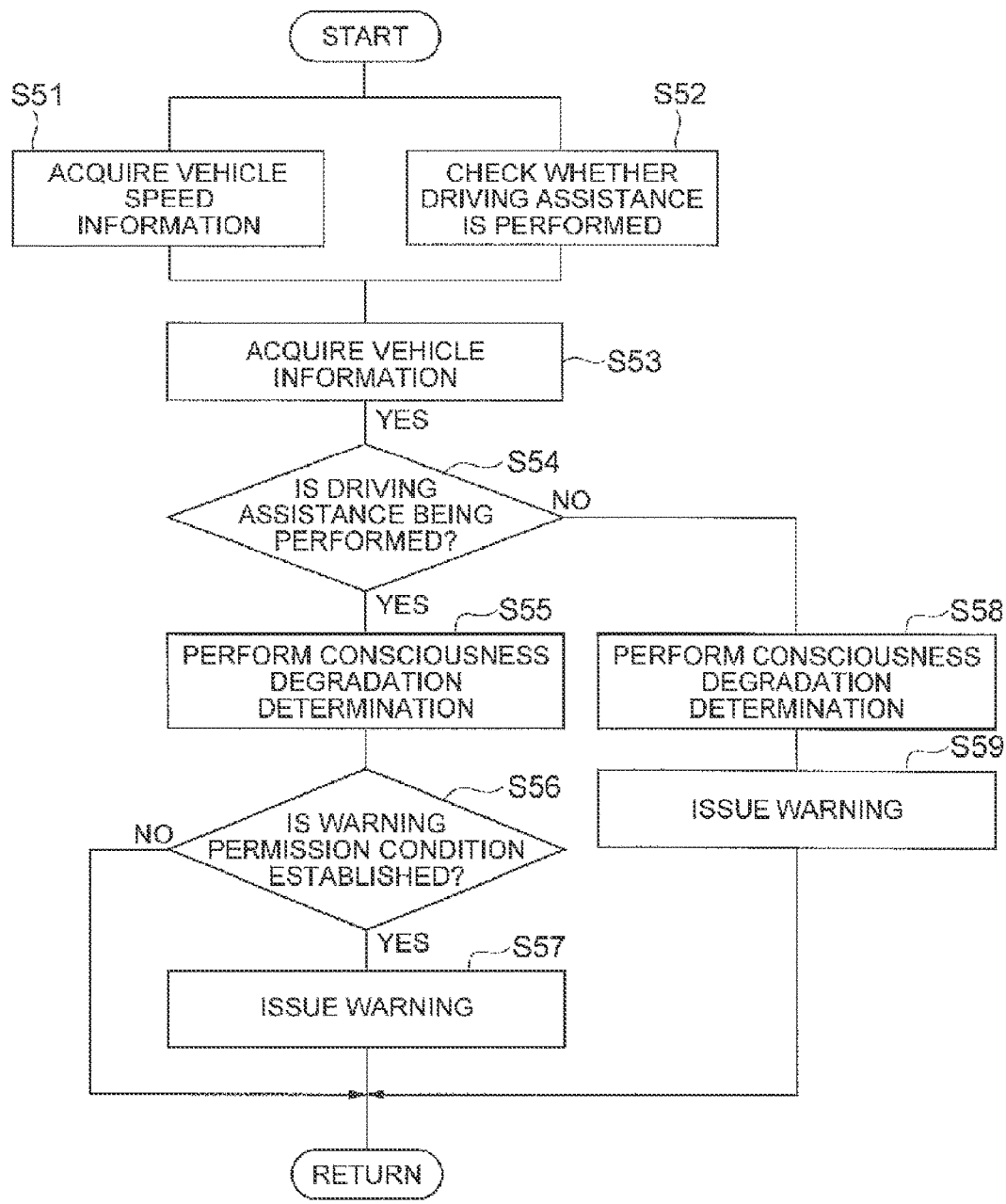
FIG. 6 is a flowchart illustrating the flow of the operation of a driving assistance device according to a fourth embodiment.

Next, a fourth embodiment of the invention will be described. FIG. 6 is a flowchart illustrating the flow of the operation of a driving assistance device according to the fourth embodiment. As shown in FIG. 6, a driving assistance device 1 according to the fourth embodiment differs from the driving assistance device 1 according to the third embodiment in a flow when an execution determination unit 12 determines that a driving assistance unit 11 performs driving assistance. In the fourth embodiment, when the execution determination unit 12 determines that the driving assistance unit 11 performs the driving assistance (S54; YES), consciousness degradation is determined (S55). When it is determined that the driver of the host vehicle is in a consciousness-degraded state, a warning determination unit 16 determines whether warning permission conditions which are set for the traveling state of the host vehicle in advance are established (S56).

When the warning permission conditions which are set for the traveling state of the host vehicle in advance are established (S56; YES), the warning determination unit 16 determines to set a warning unit 9 to a warning issuable state. When the value of vehicle speed information output from a vehicle speed sensor 6 is equal to or greater than a reference value, the warning unit 9 issues a warning and this operation ends. On the other hand, when the warning permission conditions for the traveling state of the host vehicle are not established (S56; NO), the warning determination unit 16 determines to set the warning unit 9 to a warning issue stop state. The warning unit 9 does not issue a warning and this process ends. The warning permission conditions may be one condition or a plurality of conditions. When the warning permission conditions are a plurality of conditions, all of the conditions need to be established. When all of the conditions are not established, it is determined that the warning permission conditions are not established. In addition, a flow when the execution determination unit 12 determines that the driving assistance unit 11 does not perform the driving assistance is the same as that in the driving assistance device 1 according to the third embodiment.

As described above, in the driving assistance device 1 according to the fourth embodiment, when the execution determination unit 12 determines that the driving assistance unit 11 performs the driving assistance, the warning determination unit 16 determines whether the warning permission conditions are established, in addition to the consciousness degradation determination process of the consciousness degradation determination unit 13. Therefore, when the execution determination unit 12 determines that the driving assistance unit 11 performs the driving assistance, conditions for issuing a warning are added and a warning is less likely to be issued than that when the execution determination unit 12 determines that the driving assistance unit 11 does not perform the driving assistance. As a result, it is possible to reduce the discomfort of the driver due to a warning when the consciousness of the driver is clear.

Fifth Embodiment

A fifth embodiment differs from the fourth embodiment in a flow when an execution determination unit 12 determines that a driving assistance unit 11 performs driving assistance. As shown in FIG. 6, in the fourth embodiment, when the execution determination unit 12 determines that the driving assistance unit 11 performs the driving assistance, consciousness degradation is determined (S55) and it is determined whether warning permission conditions are established (S56). Therefore, in the fifth embodiment, when the execution determination unit 12 determines that the driving assistance unit 11 performs the driving assistance and the consciousness degradation determination unit 13 determines that the driver of the host vehicle is in a consciousness-degraded state, stimulation which is given to the driver by a warning issued by a warning unit 9 is reduced and this process ends. A flow when the execution determination unit 12 determines that the driving assistance unit 11 does not perform the driving assistance is the same as that in the driving assistance device 1 according to the fourth embodiment.

As described above, in a driving assistance device 1 according to the fifth embodiment, when the execution determination unit 12 determines that the driving assistance unit 11 performs the driving assistance, stimulation which is given to the driver by the warning issued by the warning unit 9 is reduced. Therefore, when the position of the host vehicle is changed by the steering of the host vehicle by the driving assistance unit 11, stimulation which is given to the driver by the warning issued by the warning unit 9 is reduced even though the consciousness degradation determination unit 13 determines that the driver is in a consciousness-degraded state. As a result, it is possible to reduce the discomfort of the driver due to a warning when the consciousness of the driver is clear.

Sixth Embodiment

Figure 7:
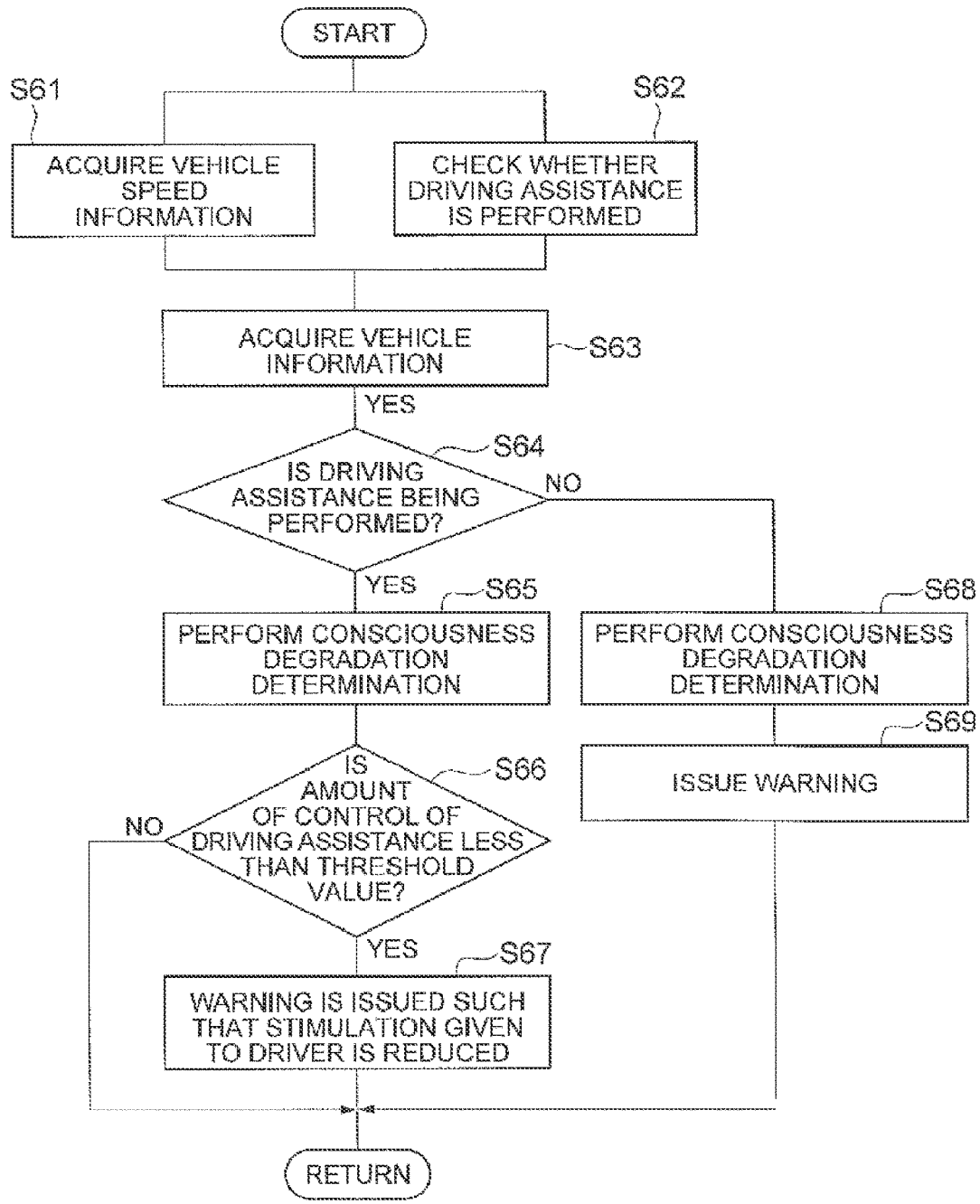
FIG. 7 is a flowchart illustrating the flow of the operation of a driving assistance device according to a sixth embodiment.

A sixth embodiment differs from the fifth embodiment in a flow when an execution determination unit 12 determines that a driving assistance unit 11 performs driving assistance. FIG. 7 is a flowchart illustrating the flow of the operation of a driving assistance device according to the sixth embodiment. As shown in FIG. 7, in the sixth embodiment, when the execution determination unit 12 determines that the driving assistance unit 11 performs the driving assistance (S64; YES) and a consciousness degradation determination unit 13 determines that the driver of the host vehicle is in a consciousness-degraded state (S65), it is determined whether the amount of control of the driving assistance is less than a threshold value (S66).

When it is determined whether the amount of control of the driving assistance is less than the threshold value (S66; YES), stimulation which is given to the driver by a warning issued by a warning unit 9 is reduced. Instead of reducing the stimulation which is given to the driver by the warning issued by the warning unit 9, a warning may be less likely to be issued by the warning unit 9. For example, an offset D or a threshold value of a steering angle for determining the consciousness-degraded state may increase such that the driver is less likely to be determined in the consciousness-degraded state, or the warning unit 9 may be set to a warning issue stop state. The offset D or the threshold value of the steering angle for determining the consciousness-degraded state may increase so as to be proportional to the amount of control of the driving assistance. On the other hand, when it is determined that the amount of control of the driving assistance is less than the threshold value (S66; NO) and the value of vehicle speed information output from a vehicle speed sensor 6 is equal to or greater than a reference value, a warning is issued, without reducing the stimulation given to the driver by the warning unit 9, and this operation ends. A flow when the execution determination unit 12 determines that the driving assistance unit 11 does not perform the driving assistance is the same as that in the fourth embodiment.

As described above, in the sixth embodiment, when the execution determination unit 12 determines that the driving assistance unit 11 performs the driving assistance, it is determined whether the amount of control of the driving assistance is less than a threshold value (S66). When the amount of control of the driving assistance is less than the threshold value, the possibility of the vehicle departing from the traveling lane is reduced and it is not considered that the consciousness of the driver is reduced. Therefore, when the amount of control of the driving assistance is less than the threshold value, a warning is less likely to be issued by the warning unit 9. As a result, it is possible to reduce the discomfort of the driver due to a warning when the consciousness of the driver is clear.

Seventh Embodiment

A seventh embodiment differs from the sixth embodiment in a flow when an execution determination unit 12 determines that a driving assistance unit 11 performs driving assistance. In the sixth embodiment, when the execution determination unit 12 determines that the driving assistance unit 11 performs the driving assistance (S64; YES), it is determined whether the driver is in the consciousness-degraded state. When it is determined that the driver is in the consciousness-degraded state (S65), it is determined whether the amount of control of the driving assistance is less than the threshold value. In contrast, in the seventh embodiment, when the execution determination unit 12 determines that the driving assistance unit 11 performs the driving assistance during the consciousness degradation determination process (S64; YES), the consciousness degradation determination process which is being currently performed is temporarily interrupted. The interruption of the consciousness degradation determination process is maintained until the execution determination unit 12 determines that the driving assistance unit 11 does not perform the driving assistance. Then, when the driving assistance ends and it is determined that the driving assistance is not performed, the consciousness degradation determination process is resumed. A flow when the execution determination unit 12 determines that the driving assistance unit 11 does not perform the driving assistance is the same as that in the sixth embodiment.

Next, the relationship between the execution state of the driving assistance and the determination of consciousness degradation will be described. FIG. 8 shows an example of the trace of the vehicle. In addition, FIG. 8 shows a variation in an LKA operation flag and a wandering alert flag over time and the number of wanderings when the driving assistance device 1 according to the seventh embodiment is used. The diagram which shows the trace of the vehicle shows a threshold value Dt of the offset D when wandering is determined.

In the wandering determination, it is determined that one wandering occurs when the host vehicle moves in the left-right direction at the position where the offset D is greater than the threshold value Dt. When the number of wanderings is greater than a predetermined value, it is determined that the driver is in the consciousness-degraded state and the wandering alert flag is turned on. In addition, in the determination of consciousness degradation, when the number of wanderings counted reaches a predetermined value for a predetermined count time, it may be determined that the driver is in the consciousness-degraded state.

In the example shown in FIG. 8, seven wanderings are counted. Next, the difference between an example according to this embodiment and a comparative example will be described. In both the example and the comparative example, the number of wanderings is reset after a predetermined period of time has elapsed from the last count of the number of wanderings. In the example, when the LKA operation flag is turned on, the count of the number of wanderings is interrupted. After the LKA operation flag is turned off, the count of the number of wanderings is resumed from the point where the count is interrupted. In contrast, in the comparative example, after a predetermined period of time has elapsed from the last count of the number of wanderings, the number of wanderings is reset, regardless of whether the LKA operation flag is turned on or off.

In the example shown in FIG. 8, LKA operates between the fourth wandering and the fifth wandering in the example and the LKA operation flag is turned on. In this case, in the example, when the LKA operation flag is turned on, the count of the number of wanderings is interrupted. After the LKA operation flag is turned off, the count of the number of wanderings is resumed, without resetting the number of wanderings. In contrast, in the comparative example, even though the LKA operation flag is turned on, the number of wanderings continues to be counted.

Therefore, in the example, when the number of wanderings reaches to 7, it is determined that the driver is in the consciousness-degraded state and the wandering alert flag is turned on. In contrast, in the comparative example, when the LKA operation flag is in an on state, the number of wanderings is reset. As a result, the number of wanderings, which is counted as 7 in the example, is counted as 3, it is determined that the driver is not in the consciousness-degraded state, and the wandering alert flag is turned off.

In the comparative example, when the LKA operation flag is in an on state, the number of wanderings is reset. It takes a lot of time until a predetermined number of wanderings are counted and the time when the driver is determined to be in the consciousness-degraded state is delayed. In contrast, in the seventh embodiment, when the LKA operation flag is turned on, the count of the number of wanderings is interrupted. After the LKA operation flag is turned on, the count of the number of wanderings is resumed, without resetting the number of wanderings. Therefore, for example, while the driving assistance is performed, the traveling of the vehicle can be barely maintained by steering by the driving assistance unit 11. However, in practice, when the driver falls asleep at the wheel, it is possible to prevent the time when the driver is determined to be in the consciousness-degraded state from being delayed and thus prevent a delay in the issue of a warning.

In the seventh embodiment, when the execution determination unit 12 determines that the driving assistance unit 11 performs the driving assistance, the consciousness degradation determination unit 13 temporarily interrupts the consciousness degradation determination process which is currently being performed. After the execution determination unit 12 determines that the driving assistance ends, the consciousness degradation determination unit 13 resumes the interrupted consciousness degradation determination process. During the driving assistance, even when the consciousness of the driver is degraded, it is easy for the host vehicle to stably travel. Therefore, while the driving assistance is being performed, the determination accuracy of consciousness degradation is reduced. From this point, in the seventh embodiment, when the execution determination unit 12 determines that the driving assistance starts, the consciousness degradation determination which is currently being performed is temporarily interrupted. After the execution determination unit 12 determines that the driving assistance ends, the interrupted consciousness degradation determination is resumed. Therefore, it is possible to perform the consciousness degradation determination, except for the result of the consciousness degradation determination obtained in the state in which the accuracy of determination is low. As a result, it is possible to perform the consciousness degradation determination with high accuracy.

The embodiments of the invention have been described in detail above. However, the invention is not limited to the above-described embodiments. Various modifications and changes of the invention can be made without departing from the scope and spirit of the invention.

In this embodiment, the warning lamp or the warning buzzer is given as an example of the warning unit 9. However, the warning unit 9 is not limited thereto. For example, a warning screen may be displayed on an in-vehicle monitor or a seat may be vibrated to call attention to the driver. In addition, air suspension control which adjusts the amount of air in an air bag to change the height of the vehicle may be performed to call attention to the driver.

In this embodiment, the driving assistance unit 11 gives the target output torque which is calculated on the basis of the curve curvature (1/R), the offset D, and the yaw angle θ to the driving assistance actuator 8 to control the position of the host vehicle relative to the traveling lane. However, the invention is not limited thereto. For example, LKA serving as a system which reduces the burden of the driver during driving using a lane keeping assistance function may be applied as the driving assistance unit 11. In addition, a collision avoidance support system which detects obstacles around the host vehicle and performs braking control or steering control so as to avoid a collision with the detected obstacles may be applied as the driving assistance unit 11.

In this embodiment, the consciousness degradation determination unit 13 determines whether the driver is in the consciousness-degraded state on the basis of whether the offset D oscillates at an amplitude or frequency equal to or greater than a predetermined value for a predetermined period of time or more or the steering angle has a unique pattern in which it significantly increases in the consciousness-degraded state. However, the method for determining the consciousness degradation is not limited thereto. When the driver performs other steering operations, it may be determined that the driver is in the consciousness-degraded state.

For example, the consciousness degradation determination unit 13 may determine the consciousness degradation on the basis of the positional information of the host vehicle, such as the curve curvature (1/R), the offset D, and the yaw angle θ detected by the driving assistance unit 11. In this case, the consciousness degradation determination unit 13 determines that the driver of the host vehicle is in the consciousness-degraded state when a variation in the position of the host vehicle is equal to or greater than a predetermined value and determines that the driver of the host vehicle is not in the consciousness-degraded state when the variation in the position of the host vehicle is less than the predetermined value. In addition, the consciousness degradation may be determined on the basis of outputs from the vehicle speed sensor 6 or the driving operation calculation unit 7 attached to the host vehicle.

The consciousness degradation determination unit 13 may determine predetermined standards, such as the position of the vehicle in the traveling lane or a steering operation for determining the consciousness-degraded state, in advance and may determine the consciousness degradation on the basis of the degree of separation from the predetermined standards. In addition, the consciousness degradation determination unit 13 may include standard determination means for standards for determining the consciousness-degraded state and the standards for determining the consciousness-degraded state may be changed depending on whether the driving assistance is performed.

In this embodiment, one of the conditions for setting the warning unit 9 to the warning issuable state is that the speed of the host vehicle is equal to or greater than the predetermined reference value. However, even when the speed of the host vehicle is not equal to or greater than the predetermined reference value, the warning unit 9 may be set to the warning issuable state.

REFERENCE SIGNS LIST

1: DRIVING ASSISTANCE DEVICE
2: WHITE LINE CAMERA
3: YAW RATE SENSOR
4: ACCELERATION SENSOR
5: STEERING ANGLE SENSOR
6: VEHICLE SPEED SENSOR
7: DRIVING OPERATION CALCULATION UNIT
8: DRIVING ASSISTANCE ACTUATOR
9: WARNING UNIT
10: DRIVING ASSISTANCE ECU
11: DRIVING ASSISTANCE UNIT
12: EXECUTION DETERMINATION UNIT
13: CONSCIOUSNESS DEGRADATION DETERMINATION UNIT
14: ASSISTANCE RELEASE DETECTION UNIT
15: OPERATION RELEASE DETERMINATION UNIT
16: WARNING DETERMINATION UNIT

The invention claimed is:

1. A driving assistance device comprising:
driving assistance means for performing driving assistance in order to control a position of a host vehicle relative to a traveling lane;
execution determination means for determining whether or not the driving assistance means is performing the driving assistance;
consciousness degradation determination means for determining whether a driver of the host vehicle is in a consciousness-degraded state on the basis of a traveling state of the host vehicle; and
warning means for issuing a warning when the consciousness degradation determination means determines that the driver is in the consciousness-degraded state,
wherein, when the execution determination means determines that the driving assistance means is performing the driving assistance, the warning means is less likely to issue the warning than that when the execution determination means determines that the driving assistance means is not performing the driving assistance.

2. The driving assistance device according to claim 1,
wherein, when the execution determination means determines that the driving assistance means is performing the driving assistance, the consciousness degradation determination means is less likely to determine that the driver of the host vehicle is in the consciousness-degraded state than when the execution determination means determines that the driving assistance means is not performing the driving assistance.

3. The driving assistance device according to claim 1,
wherein the warning means is set to a warning issue stop state in which the warning means stops the issue of the warning when the execution determination means determines that the driving assistance means is performing the driving assistance.

4. The driving assistance device according to claim 1,
wherein, in a case in which the execution determination means determines that the driving assistance means is performing the driving assistance, when a warning permission condition which is predetermined for the traveling state of the host vehicle is established, the warning means is set to a warning issuable state in which the warning means can issue the warning, and
when the warning permission condition for the traveling state of the host vehicle is not established, the warning means is set to a warning issue stop state in which the warning means stops the issue of the warning.

5. A driving assistance device comprising:
driving assistance means for performing driving assistance in order to control a position of a host vehicle relative to a traveling lane;
execution determination means for determining whether or not the driving assistance means is performing the driving assistance;
consciousness degradation determination means for determining whether a driver of the host vehicle is in a consciousness-degraded state on the basis of a traveling state of the host vehicle; and
warning means for issuing a warning when the consciousness degradation determination means determines that the driver is in the consciousness-degraded state,
wherein, when the execution determination means determines that the driving assistance means is performing the driving assistance, stimulation which is given to the driver by the warning issued by the warning means is less than when the execution determination means determines that the driving assistance means is not performing the driving assistance.

6. The driving assistance device according to claim 1,
wherein, when the execution determination means determines that the driving assistance means is performing the driving assistance, it is also determined whether an amount of control of the driving assistance is less than a predetermined threshold value, and
when it is determined that the amount of control of the driving assistance is less than the threshold value, the warning means is less likely to issue the warning than when the execution determination means determines that the driving assistance means is not performing the driving assistance.

7. The driving assistance device according to claim 1,
wherein, when the execution determination means determines that the driving assistance starts while the consciousness degradation determination means performs consciousness degradation determination, the consciousness degradation determination means temporarily interrupts the consciousness degradation determination which is currently being performed, and after the execution determination means determines that the driving assistance ends, the consciousness degradation determination means resumes the interrupted consciousness degradation determination.

8. The driving assistance device according to claim 1, further comprising:

assistance release detection means for detecting whether the driving assistance by the driving assistance means is released by establishment of a plurality of release conditions, and wherein, when the assistance release detection means detects that the driving assistance is released, the warning means is set to the warning issue stop state in which the warning means stops the issue of the warning or the warning issuable state in which the warning means can issue the warning, according to an establishment state of the release conditions, after the driving assistance is released.

9. The driving assistance device according to claim 8, further comprising:

operation release determination means for determining whether the driving assistance is released by an operation of the driver after the assistance release detection means detects that the driving assistance by the driving assistance means is released, wherein, when the operation release determination means determines that the driving assistance is released by an operation other than the operation of the driver, the warning means is set to the warning issuable state after the driving assistance is released.

10. The driving assistance device according to claim 8, further comprising:

operation release determination means for determining whether the driving assistance is released by an operation of the driver after the assistance release detection means detects that the driving assistance by the driving assistance means is released, wherein, in a case in which the operation release determination means determines that the driving assistance is released by an operation other than the operation of the driver, when the warning means is set to the warning issue stop state immediately before the driving assistance is released, the warning means is set to the warning issue stop state after the driving assistance is released, and when the warning means is set to the warning issuable state immediately before the driving assistance is released, the warning means is set to the warning issuable state after the driving assistance is released.

11. The driving assistance device according to claim 8, further comprising:

operation release determination means for determining whether the driving assistance is released by an operation of the driver after the assistance release detection means detects that the driving assistance by the driving assistance means is released, wherein, when the operation release determination means determines that the driving assistance is released by the operation of the driver, the warning means is set to the warning issue stop state after the driving assistance is released.

12. A driving assistance device of a host vehicle, comprising:

an electronic control unit (ECU) including executable program logic configured to:

perform driving assistance in order to control a position of a host vehicle relative to a traveling lane;

determine whether the driving assistance is being performed;

determine whether a driver of the host vehicle is in a consciousness-degraded state on the basis of a traveling state of the host vehicle; and issue a warning when the driver is determined to be in the consciousness-degraded state, wherein, when the driving assistance is being performed, the warning is less likely to be issued than when the driving assistance is not being performed.

* * * * *